United States Patent [19]

Vitale

[11] Patent Number: 4,659,614
[45] Date of Patent: Apr. 21, 1987

[54] ULTRASONICALLY BONDED NON-WOVEN FABRIC

[75] Inventor: Joseph Vitale, Charlotte, N.C.

[73] Assignee: Perfect Fit Industries, Monroe, N.C.

[21] Appl. No.: 756,423

[22] Filed: Jul. 18, 1985

[51] Int. Cl.⁴ .............................................. B32B 7/02
[52] U.S. Cl. ................................... 428/218; 156/73.1;
428/198; 428/280; 428/284; 428/296; 428/300;
428/172
[58] Field of Search ............ 156/73.1, 73.4, 308.4,
156/290, 324, 580.1, 580.2; 428/156, 171, 172,
195, 198, 218, 280, 283, 284, 300, 301, 296, 213,
215

[56] References Cited

U.S. PATENT DOCUMENTS

| | | | |
|---|---|---|---|
| 3,575,752 | 4/1971 | Carpenter | 156/73 |
| 4,259,399 | 3/1981 | Hill | 428/288 |
| 4,311,540 | 1/1982 | Hill | 156/73.1 |
| 4,400,227 | 8/1983 | Riemersma | 156/324 |
| 4,406,720 | 9/1983 | Wang et al. | 156/73.2 |
| 4,414,045 | 11/1983 | Wang et al. | 156/73.2 |
| 4,565,735 | 1/1986 | Murka et al. | 428/300 |

Primary Examiner—James J. Bell
Attorney, Agent, or Firm—Seidel, Gonda, Goldhammer & Abbott

[57] ABSTRACT

Ultrasonically bonded non-woven fabric which simulates either needle punched felt or ribcord felt is disclosed. The fabric comprised a loose packed batt which is welded to itself and alternatively can have either one or more additional dense packed layers welded thereon. Methods and apparatus are disclosed for making the fabric.

10 Claims, 9 Drawing Figures

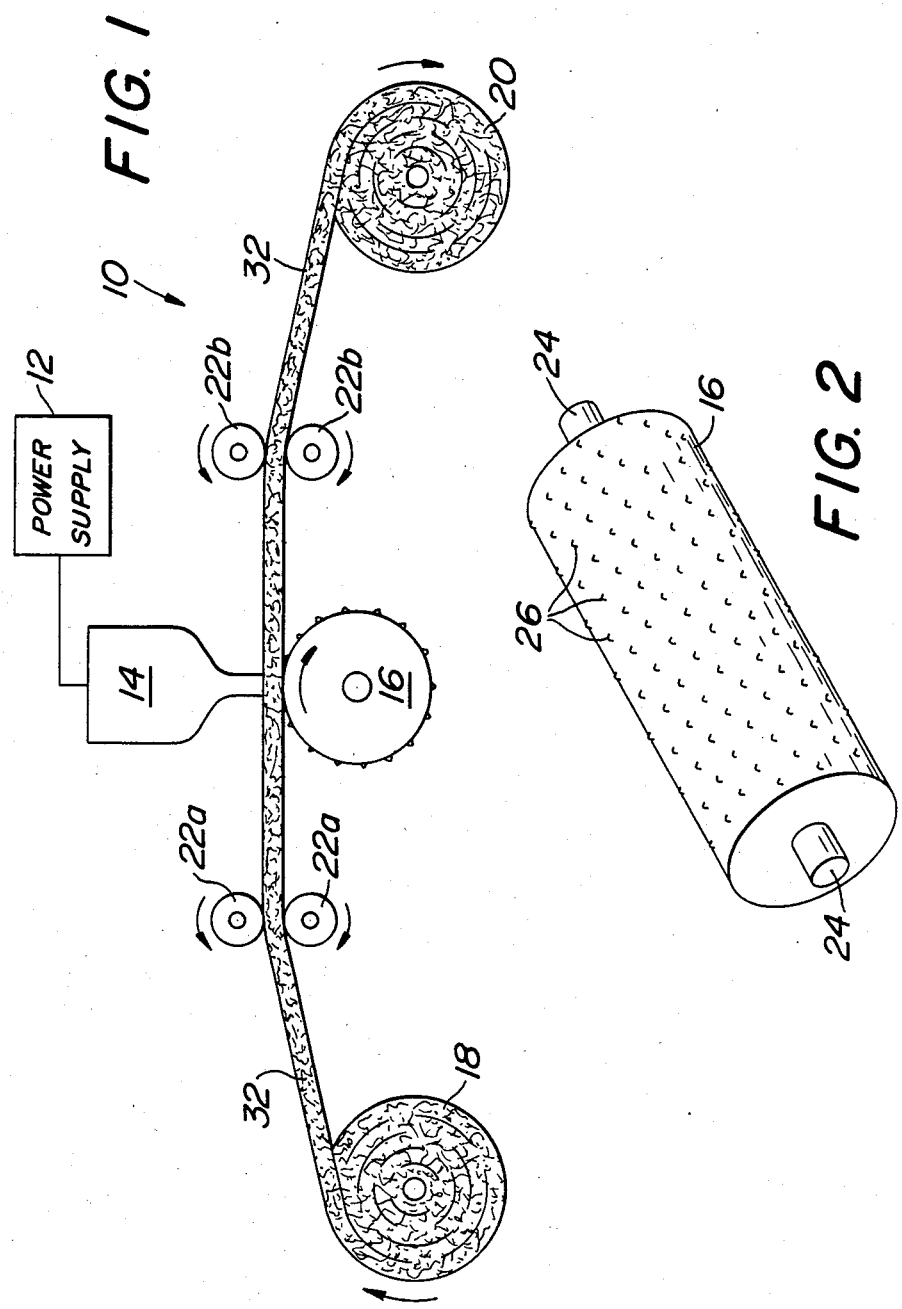

ULTRASONICALLY BONDED NON-WOVEN FABRIC

BACKGROUND OF THE INVENTION

The present invention is directed to ultrasonically bonded non-woven fabrics and the method and apparatus used in making same.

Ultrasonic bonding of non-woven fabrics is known. For instance, see U.S. Pat. Nos. 3,575,752; 4,259,399; 4,311,540; 4,406,720; and 4,414,045. Each of these patents disclose a method and/or apparatus for the ultrasonic bonding of non-woven fabric. However, none of these patents specifically disclose a fabric, method or apparatus for making a simulated needle punch felt or ribcord type felt product using ultrasonic bonding.

Such a simulated needle punch type felt or ribcord type felt of either a semidisposable or permanent fabric is highly desirable in such industries as home furnishing industry, although the uses of such a material are not necessarily limited to that industry.

The simulated needle punch type felt and ribcord type felt made according to the present process is far superior to the prior art materials in that manufacturing speeds are greatly increased and the insulating properties of the new fabrics are greatly improved compared to prior methods.

SUMMARY OF THE INVENTION

The present invention discloses a quilt-like fabric having a dense packed layer of non-woven material, and a loose packed batt of non-woven, weldable material having a thickness substantially greater than the dense packed layer.

A method for quilting is disclosed including the steps of: (1) dispensing a dense packed layer from a layer source; (2) dispensing a loose packed batt from a batt source; (3) positioning the layer in face contact with the batt; (4) transporting the layer and batt, which are in face contact past a welding station; (5) welding the layer and the batt together; and (6) taking up the layer in the batt onto a takeup device.

An apparatus for making a quilted fabric is disclosed and includes an ultrasonic welding means, roller having an axis spaced apart from the welding means, the ultrasonic welding means being parallel to the axis of the roller, a plurality of radially extending projections disposed on a circumferential surface of the roller, a first dispensing means adapted for feeding a dense packed layer of non-woven, ultrasonically weldable material between said ultrasonic welding means and said roller, a second dispensing means adapted for feeding a loose packed batt of non-woven ultrasonically weldable material between said ultrasonic welding means and the roller, whereby the layer and the batt are welded together while passing between the ultrasonic welding means of the roller and a takeup means adapted for receiving the layer and the batt after being welded together.

An object of this invention is to provide a simulated needle punch type felt and/or a ribcord type felt.

A further object of this invention is to provide a method for making the simulated needle punch type felt or ribcord type felt.

A still further object of this invention is to provide an apparatus for making the simulated needle punch type felt or ribcord type felt.

A further object of this invention is to provide an ultrasonically welded material which is easy to make and inexpensive to produce.

Other objects and advantages of the present invention follow from the detailed disclosure.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a schematic illustration of the apparatus for ultrasonically welding a batt.

FIG. 2 is an isometric view of an anvil used in the apparatus shown in FIG. 1.

DETAILED DESCRIPTION OF THE INVENTION

Figure 3:
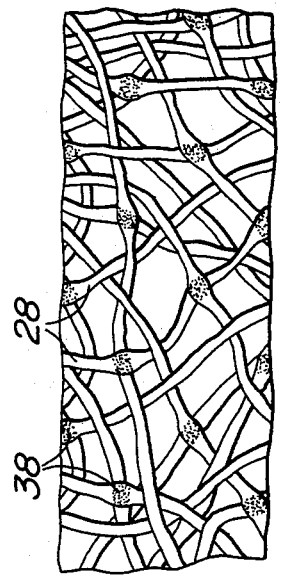
FIG. 3 is an illustration of a section of the non-woven fabric, greatly magnified.

Referring to the drawings, wherein like numerals indicate like elements, there is shown in FIG. 1 an ultrasonic welding apparatus for making fabric according to the present invention generally designated as 10. The apparatus generally comprises a power supply 12 which is connected to an ultrasonic welder 14. The apparatus 10 is provided with an anvil 16 which is generally cylindrical and has a plurality of radially extending projections about the circumferential surface of the roller 16. The anvil 16 has an axis. The ultrasonic welder 14 is spaced away and parallel to the axis of the anvil 16. The anvil 16 is provided with an axle 24 which is coaxial with the cylindrical anvil 16. The anvil 16 is rotatable about the axle 24.

A loose packed batt 32 is dispensed from a batt dispenser 18 and is guided between the ultrasonic welder 14 and anvil 16 to a take up roll 20 by driven tension rollers 22a and 22b. Rollers 22b are preferably driven slightly faster than rollers 22a in order to put slight tension on batt 32 as it passes between welder 14 and anvil 16.

Figure 6:
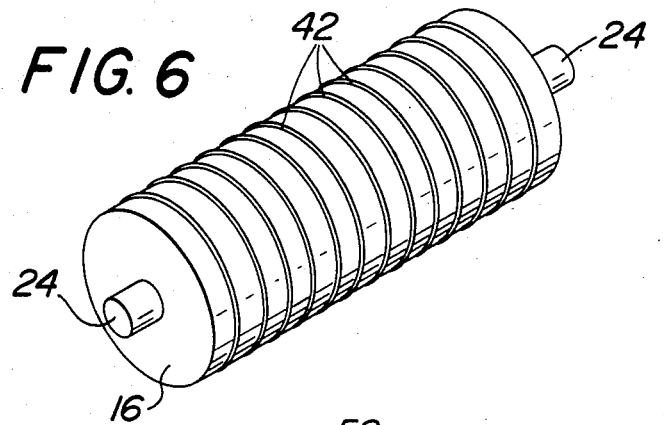
FIG. 6 is an isometric illustration of an alternative anvil used in the apparatus disclosed.

Referring to FIGS. 2 and 6 wherein are shown two alternative embodiments of the anvil 16, FIG. 2 illustrates an anvil 16 having a plurality of discrete projections 26 disposed about the circumferential surface of the anvil 16. This anvil is used when simulated punch type felts are desired. These discrete projections 26 serve to focus the ultrasonic energy and mechanically push the loosely woven fibers of the batt together whereby they may be welded by the ultrasonic welder. Thus, the ultrasonically welded strands of the loosely woven batt are melted together. In FIG. 3, there is shown an illustration of the strands 28 ultrasonically bonded together at strand weld 30. Alternatively, the anvil 16 illustrated in FIG. 6 has a plurality of circumferential ridges spaced apart along the axis of the anvil 16. This anvil 16 is used when ribcord type felts are desired. Although the ridges 42 are shown circumferentially about anvil 16, the ridges 42 may also be disposed longitudinally, i.e. parallel to the axis.

Figure 4:
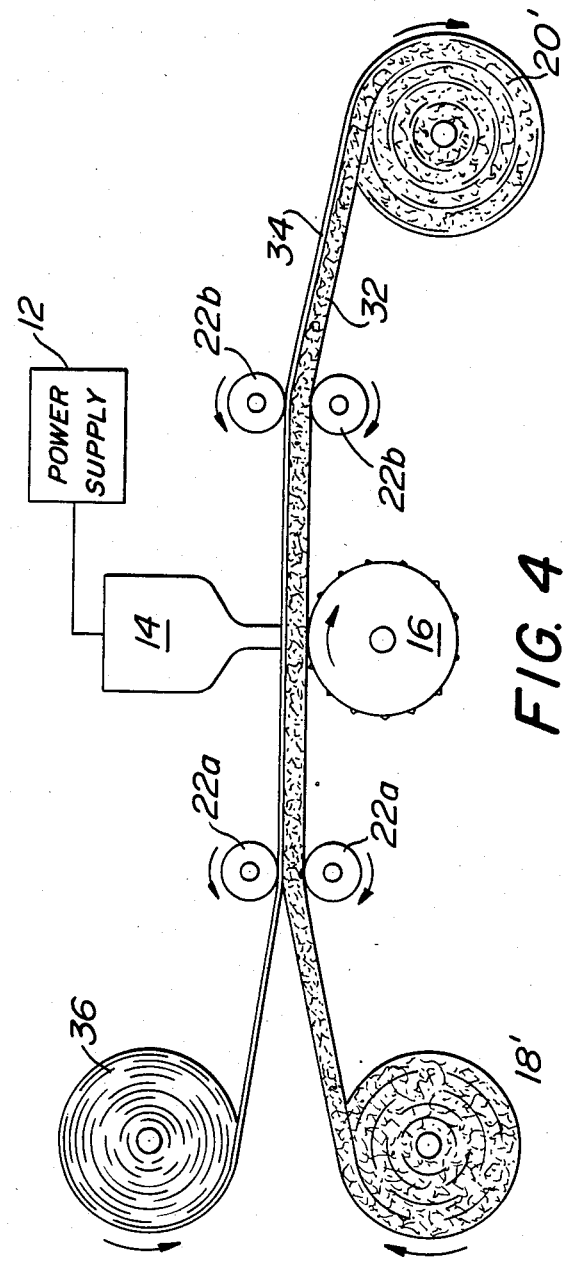
FIG. 4 is an illustration of an apparatus wherein two layers of non-woven material are ultrasonically welded together.
Figure 5:
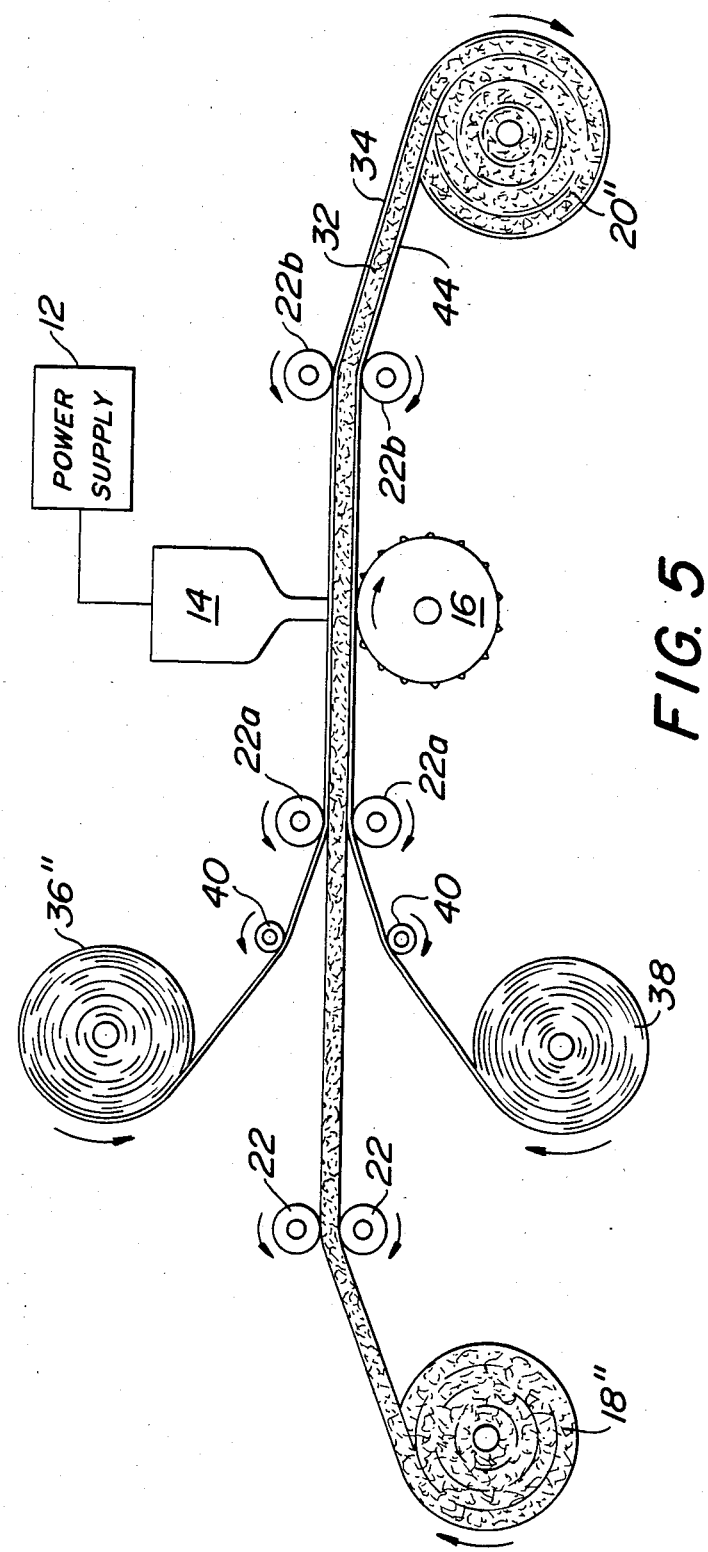
FIG. 5 is a schematic illustration of an apparatus wherein three layers of ultrasonically weldable material are joined together.

Referring to FIGS. 4 and 5, there is shown alternative embodiments of the present invention similar to the embodiment disclosed in FIG. 1. In FIG. 4, an apparatus for joining a dense packed layer 34 and a loose packed batt 32 is illustrated. A first dense pack dispenser 36 supplies the dense packed layer to the apparatus. A batt dispenser 18' dispenses the batt to the apparatus. The dense packed layer 34 and batt 32 are positioned in face contact with one another prior to their entry between the ultrasonic welder 14 and anvil 16. Upon exit from between ultrasonic welder 14 and anvil 16, the dense packed layer 34 and batt 32 are welded in juxtaposed relation to one another. Rollers 22a and 22b are driven at slightly different speeds as noted previously.

Referring to FIG. 5, a second dense packed layer dispenser 38 has been added to the apparatus and additional idler guides 40 are provided to provide guidance and tension to the respective layers. Layers 32, 34 and 44 are placed in face contact prior to passing between ultrasonic welder 14 and anvil 16. Upon exit of the combined layers from between the ultrasonic welder 14 and anvil 16, they are welded in juxtapoxed relation to one another.

Figure 7:
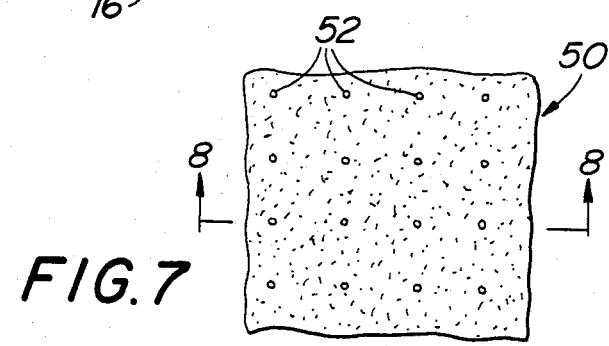
FIG. 7 is an enlarged plan view of a piece of fabric made according to the present invention.
Figure 8:
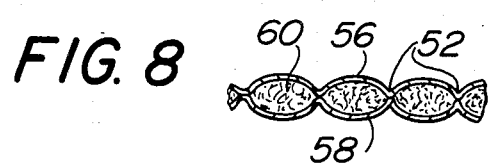
FIG. 8 is a sectional end view taken generally along lines 8—8 of FIG. 7 of the fabric made according to the present invention.
Figure 9:
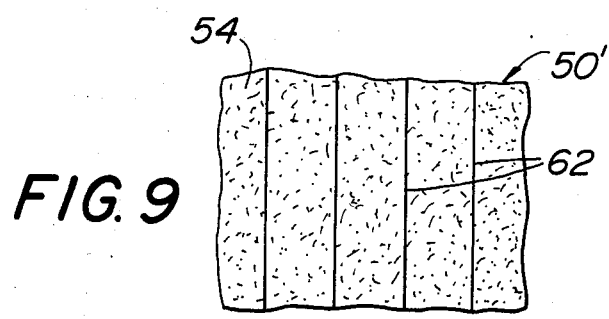
FIG. 9 is a sectional view of an alternative embodiment of the fabric made according to the present invention.

Referring to FIGS. 7–9, there is shown an alternative embodiment of the fabric produced by the above disclosed method and apparatus. In FIG. 7, there is illustrated a top plan view of the fabric 50. Fabric 50 has a plurality of point fabric welds 52 and a plurality of smaller point dense packed fabric welds 54. The point dense packed fabric welds 54 are made in an earlier operation which is akin to the method disclosed in association with FIG. 1. The larger point fabric welds 52 are made when welding together the various fabric layers in an operation as illustrated in FIGS. 4 and 5. Although the point fabric welds 52 are shown in straight line arrangement, any pattern of point welds may be used. Alternatively, a simulated ribcord type fabric 50' is illustrated in FIG. 4 and is similar to the fabric 50 illustrated in FIG. 7 but for the line fabric welds 62 which run the entire length or alternatively width of the fabric 50'.

FIG. 8 illustrates a cross-sectional view of the fabric 50 or 50'. A first dense packed layer 56 is juxtaposed to a loose packed batt 60. A second dense packed layer 58 is disposed on the side opposite of the batt from the first dense packed layer 56. Dense packed layers 56 and 58 sandwich the batt 60.

The present invention may be embodied in other specific forms without departing from the spirit or essential attributes thereof and, accordingly, reference should be made to the appended claims, rather than to the foregoing specification, as indicating the scope of the invention.

I claim:

1. A quilted fabric comprising:
    a dense packed layer of non-woven, weldable material;
    a loose packed batt of non-woven, weldable material having a thickness substantially greater than said layer, said batt being juxtaposed to said layer; and
    a plurality of welds joining said layer to said batt.

2. The fabric according to claim 1 wherein said layer and said batt are ultrasonically weldable materials.

3. The fabric according to claim 1 wherein said plurality of welds are ultrasonic welds.

4. The fabric according to claim 1 wherein said plurality of welds are point welds.

5. The fabric according to claim 1 wherein said plurality of welds are line welds.

6. The fabric according to claim 1 further comprising:
    a second dense packed layer of non-woven, weldable material being located on the opposite side of said batt from said first dense packed layer and being juxtaposed to said batt, said batt being substantially thicker than said second layer; and
    said plurality of welds joining said second layer to said batt.

7. The fabric according to claim 6 wherein said second layer is an ultrasonic weldable material.

8. The fabric according to claim 6 wherein said plurality of welds are ultrasonic welds.

9. The fabric according to claim 6 wherein said plurality of welds are point welds.

10. The fabric according to claim 6 wherein said plurality of welds are line welds.

* * * * *